United States Patent
Jozsa et al.

(10) Patent No.: US 11,550,562 B2
(45) Date of Patent: *Jan. 10, 2023

(54) VIRTUALIZATION PLATFORM FOR CREATING, DEPLOYING, MODIFYING, AND RELOCATING APPLICATIONS

(71) Applicant: AT&T Intellectual Property I, L.P., Atlanta, GA (US)

(72) Inventors: Brandon Jozsa, Littleton, CO (US); Daniel Solero, Mooresville, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,357

(22) Filed: Jun. 14, 2021

(65) Prior Publication Data

US 2021/0303294 A1    Sep. 30, 2021

Related U.S. Application Data

(63) Continuation of application No. 16/599,177, filed on Oct. 11, 2019, now Pat. No. 11,036,489, which is a (Continued)

(51) Int. Cl.
*G06F 8/60* (2018.01)
*G06F 8/65* (2018.01)
(Continued)

(52) U.S. Cl.
CPC .............. *G06F 8/65* (2013.01); *G06F 8/60* (2013.01); *G06F 8/71* (2013.01); *G06F 9/455* (2013.01)

(58) Field of Classification Search
CPC ..................................................... G06F 8/60
See application file for complete search history.

(56) References Cited

U.S. PATENT DOCUMENTS

| 6,363,411 B1 | 3/2002 | Dugan et al. |
| 7,870,153 B2 | 1/2011 | Croft et al. |

(Continued)

FOREIGN PATENT DOCUMENTS

| AU | 2014233616 | 10/2014 |
| CA | 2931750 | 8/2015 |
| WO | 2017/127225 | 7/2017 |

OTHER PUBLICATIONS

Zhang et al., "CCOA: Cloud Computing Open Architecture," 2009 IEEE International Conference on Web Services (ICWS), Jul. 6-10, 2009, pp. 608-615, IEEE.

(Continued)

*Primary Examiner* — Jae U Jeon
(74) *Attorney, Agent, or Firm* — Hartman & Citrin LLC

(57) ABSTRACT

Concepts and technologies are disclosed herein for a virtualization platform for creating, deploying, modifying, and relocating applications. A computing platform can receive a software package including software code from a requestor. The software code can be analyzed to identify functions performed by an application that corresponds to the software code. First and second functions can be virtualized and containerized, and a computing environment that is to host an application including the containers can be identified. Deployment of the application can be triggered.

20 Claims, 6 Drawing Sheets

Related U.S. Application Data continuation of application No. 15/718,382, filed on Sep. 28, 2017, now Pat. No. 10,445,086.

(51) Int. Cl.
   *G06F 8/71* (2018.01)
   *G06F 9/455* (2018.01)

(56) References Cited

U.S. PATENT DOCUMENTS

| | | |
|---|---|---|
| 7,954,150 B2 | 5/2011 | Croft et al. |
| 8,051,180 B2 | 11/2011 | Mazzaferri et al. |
| 8,341,270 B2 | 12/2012 | Mazzaferri et al. |
| 8,417,798 B2 | 4/2013 | Chen et al. |
| 8,881,139 B1 | 11/2014 | Acacio |
| 9,141,443 B2 | 9/2015 | Iyer et al. |
| 9,197,599 B1 | 11/2015 | Barry et al. |
| 9,244,716 B2 | 1/2016 | Freundlich et al. |
| 9,495,142 B2 | 11/2016 | Koushik et al. |
| 9,501,304 B1 | 11/2016 | Powers et al. |
| 2007/0174410 A1 | 7/2007 | Croft et al. |
| 2007/0174429 A1 | 7/2007 | Mazzaferri et al. |
| 2007/0180449 A1 | 8/2007 | Croft et al. |
| 2013/0254321 A1* | 9/2013 | Johnsen ............. G06F 9/45533 709/212 |
| 2014/0164486 A1 | 6/2014 | Ravichandran et al. |
| 2015/0074060 A1 | 3/2015 | Varadharajan et al. |
| 2016/0127495 A1 | 5/2016 | Tasoulas |
| 2016/0132214 A1 | 5/2016 | Koushik et al. |
| 2016/0239328 A1 | 8/2016 | Kaplan |
| 2016/0344587 A1* | 11/2016 | Hoffmann ........... H04L 41/0813 |
| 2017/0098096 A1 | 4/2017 | Redberg |
| 2017/0161044 A1 | 6/2017 | Singh et al. |
| 2017/0244596 A1* | 8/2017 | Chen ................... H04L 41/0803 |
| 2019/0056971 A1* | 2/2019 | Oohira ................ G06F 9/45533 |

OTHER PUBLICATIONS

Vecchiola et al., "Aneka: A Software Platform for .NET-based Cloud Computing," vol. 18: High Speed and Large Scale Scientific Computing (2009), pp. 267-295, retrieved at https://arxiv.org/ftp/arxiv/papers/0907/0907.4622.pdf on Aug. 8, 2017.

Zhang et al., "Design of Service Component Layer in SOA Reference Architecture," 2009 33$^{rd}$ Annual IEEE International Computer Software and Applications Conference, Jul. 20-24, 2009, IEEE.

Zhang et al., "Automatic software deployment using user-level virtualization for cloud-computing," Future Generation Computer Systems, Jan. 2013, vol. 29, Issue 1, pp. 323-329, Elsevier.

Zhong et al., "vSaaS: A Virtual Software as a Service Architecture for Cloud Computing Environment," 5$^{th}$ IEEE International Conference on e-Science, Dec. 9-11, 2009, IEEE.

Leyman et al., "Moving Applications to the Cloud: An Approach Based on Application Model Enrichment," International Journal of Cooperative Information Systems, Sep. 2011, vol. 20, No. 3, pp. 307-356, World Scientific Publishing Company.

Pahl, Claus, "Containerisation and the PaaS Cloud," IEEE Cloud Computing Magazine 2.3, May 6, 2015, IEEE.

Binz et al., "CMotion: A Framework for Migration of Applications into and between Clouds," Proceedings of the 2011 IEEE International Conference on Service-Oriented Computing and Applications, Dec. 12-14, 2011, IEEE.

Binz et al., "Portable Cloud Services Using Tosca," IEEE Internet Computing, May 2012, vol. 16, No. 3, pp. 80-85, IEEE.

U.S. Notice of Allowance dated May 28, 2019 in U.S. Appl. No. 15/718,382.

U.S. Notice of Allowance dated Feb. 8, 2021 in U.S. Appl. No. 16/599,177.

* cited by examiner

VIRTUALIZATION PLATFORM FOR CREATING, DEPLOYING, MODIFYING, AND RELOCATING APPLICATIONS

CROSS-REFERENCE TO RELATED APPLICATIONS

This application is a continuation of and claims priority to U.S. patent Ser. No. 16/599,177, entitled "Virtualization Platform for Creating, Deploying, Modifying, and Relocating Applications," filed Oct. 11, 2019, now U.S. Pat. No. 11,036,489, which is incorporated herein by reference in its entirety and which is a continuation of and claims priority to U.S. patent application Ser. No. 15/718,382, entitled "Virtualization Platform for Creating, Deploying, Modifying, and Relocating Applications," filed Sep. 28, 2017, now U.S. Pat. No. 10,445,086, which is incorporated herein by reference in its entirety.

BACKGROUND

Various cloud platforms have enabled the use of containers. Containers can be used to enable platform-agnostic delivery and runtime of applications. The container framework was designed to be agnostic to its hosting platform and the underlying operating system. For this reason, may modern cloud platforms have enabled and/or support containers.

This orchestration stack, however, can be difficult to use. Specifically, the container framework can be difficult to incorporate into an existing deployment and/or a new deployment because various projects may be intertwined with other projects and because technical resources are scarce and short deployment timelines may force technical staff to rely on known technologies.

SUMMARY

The present disclosure is directed to a virtualization platform for creating, deploying, modifying, and relocating applications. The virtualization platform can provide an open source platform that enables integration testing and evaluation of the microservices and orchestration stack of any application. The platform can allow a user or other entity to examine microservices components and determine how each component in the stack relates to one another. The virtualization platform can include a thin operating system and secure kernel, a container engine, datastores for storing configuration key-values and other data, discovery components, network overlay, schedulers, and other components. These and other functions are enabled by application programming interfaces provided by the platform to enable service and/or application rollout as an application that includes containerized functions.

A computing platform can receive, from a requestor or other entity, a software package. The software package can include software code that corresponds to an application, service, process, or the like, that the requestor wishes to deploy (or have deployed) to a computing environment. The computing platform can, via execution of a deployment creation module, analyze the software page (or the software code included therein) to identify one or more functions performed by the application, service, process, or the like associated with the software package. The computing platform can virtualize and containerize the one or more functions. In some embodiments, the virtualized functions can be hosted by a virtual machine that the computing platform can containerize. Thus, the containerized functions can include not only functions, but also virtual machines that can host the functions. The one or more containers (containing one or more functions) can be packaged by the computing platform as the application illustrated and described herein.

The computing platform also can identify an operating system and/or platform for the application. The computing platform can determine the operating system and/or platform based on input from the requestor or other entities; based on configurations and/or settings information; based on trends and/or usage statistics; based on combinations thereof; and/or based on other information. The computing platform can package the application and deploy the application (or trigger deployment of the application) to the designated computing environment (which can be designated by identification of the operating system and/or platform). The deployed application can include at least one container and the at least one container can include a virtualized function.

The computing platform can be configured to modify the application pre-deployment and/or post-deployment. Specifically, the computing platform can be configured to obtain deployment data from the monitoring and reporting modules; compare the application to the deployment trends or other types of information included in the deployment data; and determine if a change should be made (or if a change should be recommended to be made) to the application based on this analysis. If the computing platform determines that the application should be changed (e.g., by receiving input that indicates that the suggested change should be made), the computing platform can update the application. Updating the application can include virtualizing and containerizing a new function and/or making other changes (e.g., removing a function or container; changing the operating system and/or platform; or the like).

The computing platform also can be configured to move the application from one computing environment to another. In some embodiments, the computing platform can be configured to obtain deployment data from the monitoring and reporting modules; to determine first costs associated with hosting the application at a first computing environment and second costs associated with hosting the application at a second computing environment; and to determine, based on the costs and/or other considerations, whether the application should be moved. If the computing platform determines that the application should be moved to a new computing environment, the computing platform can move (or trigger moving of) the application to the new computing environment. The computing platform also can be configured to update any references to the application (e.g., a web portal or other customer-facing site or functionality may point, via a backend or other type of reference, to a first computing environment and this reference can be updated to point instead to the new computing environment). Because references to the application and/or a hosting platform can be updated in additional and/or alternative manners, it should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving a software package from a requestor. The software package can include software code. The operations also can include analyzing the software code to identify a two or more of functions performed by an application that corresponds to the software code; virtualizing a first function of the two or more of functions and a second function of the two or more of functions; creating a first container for the first function of the two or more of functions and a second container for the second function of the two or more of functions; identifying a computing environment that is to host an application including the first container and the second container; and triggering deployment of the application to the computing environment.

In some embodiments, identifying the computing environment can include obtaining, from the requestor, data that can indicate one of an operating system for a device that is to host the application or a platform for the device that is to host the application. In some embodiments, the computer-executable instructions, when executed by the processor, can cause the processor to perform operations that further can include obtaining deployment data from a monitoring and reporting module that is in communication with the computing environment; comparing the application to the deployment data; determining that the application is to be changed; and updating the application.

In some embodiments, determining if the application is to be changed can include determining if a recommendation should be provided to the requestor. The recommendation can indicate one of a third function that should be added to the application or a fourth function that should be removed from the application. The operations further can include in response to a determination that the recommendation should be provided to the requestor, providing the recommendation to the requestor, and receiving, from the requestor, an indication that the recommendation is accepted.

In some embodiments, the computer-executable instructions, when executed by the processor, can cause the processor to perform operations that further can include obtaining deployment data from a monitoring and reporting module that is in communication with the computing environment; determining a first cost associated with hosting the application at an original computing environment including the computing environment and a second cost associated with hosting the application at a new computing environment; determining that the application should be moved from the computing environment to a new computing environment; triggering moving of the application to the new computing environment; and updating references to the application.

According to another aspect of the concepts and technologies disclosed herein, a method is disclosed. The method can include receiving, at a computing platform including a processor, a software package from a requestor. The software package can include software code. The method also can include analyzing, by the processor, the software code to identify a two or more of functions performed by an application that corresponds to the software code; virtualizing, by the processor, a first function of the two or more of functions and a second function of the two or more of functions; creating, by the processor, a first container for the first function of the two or more of functions and a second container for the second function of the two or more of functions; identifying, by the processor, a computing environment that is to host an application including the first container and the second container; and triggering, by the processor, deployment of the application to the computing environment.

In some embodiments, identifying the computing environment can include determining an operating system for a device that is to host the application. In some embodiments, identifying the computing environment can include determining a platform that is to host the application. In some embodiments, identifying the computing environment can include obtaining, from the requestor, data that indicates one of an operating system for a device that is to host the application or a platform for the device that is to host the application. In some embodiments, the software package can be obtained via an application programming interface that is exposed by the computing platform. The data that indicates one of an operating system for a device that is to host the application or a platform for the device that is to host the application also can be obtained via the application programming interface.

In some embodiments, the method also can include obtaining, by the computing platform, deployment data from a monitoring and reporting module that is in communication with the computing environment; comparing, by the computing platform, the application to the deployment data; determining, by the computing platform, that the application is to be changed; and updating, by the computing platform, the application. In some embodiments, determining if the application is to be changed can include determining if a recommendation should be provided to the requestor. The recommendation can indicate one of a third function that should be added to the application or a fourth function that should be removed from the application. The operations further can include in response to a determination that the recommendation should be provided to the requestor, providing the recommendation to the requestor, and receiving, from the requestor, an indication that the recommendation is accepted.

In some embodiments, updating the application can include virtualizing a new function, containerizing the new function virtualized, and adding a containerized new function to the application. In some embodiments, the method can further include obtaining, by the computing platform, deployment data from a monitoring and reporting module that is in communication with the computing environment; determining, by the computing platform, a first cost associated with hosting the application at an original computing environment including the computing environment and a second cost associated with hosting the application at a new computing environment; determining, by the computing platform, that the application should be moved from the computing environment to a new computing environment; triggering, by the computing platform, moving of the application to the new computing environment; and updating, by the computing platform, references to the application. In some embodiments, updating the references can include updating back end references associated with the application to point to the new computing environment instead of the original computing environment.

According to yet another aspect, a computer storage medium is disclosed. The computer storage medium can store computer-executable instructions that, when executed by a processor, cause the processor to perform operations. The operations can include receiving a software package from a requestor. The software package can include software code. The operations also can include analyzing the software code to identify a two or more of functions performed by an application that corresponds to the software code; virtualizing a first function of the two or more of functions and a second function of the two or more of functions; creating a first container for the first function of the two or more of functions and a second container for the second function of the two or more of functions; identifying a computing environment that is to host an application including the first container and the second container; and triggering deployment of the application to the computing environment.

In some embodiments, identifying the computing environment can include obtaining, from the requestor, data that indicates one of an operating system for a device that is to host the application or a platform for the device that is to host the application. In some embodiments, the computer-executable instructions, when executed by the processor, can cause the processor to perform operations that further can include obtaining deployment data from a monitoring and reporting module that is in communication with the computing environment; comparing the application to the deployment data; determining if the application is to be changed; and updating the application.

In some embodiments, determining if the application is to be changed can include determining if a recommendation should be provided to the requestor. The recommendation can indicate one of a third function that should be added to the application or a fourth function that should be removed from the application. The operations further can include in response to a determination that the recommendation should be provided to the requestor, providing the recommendation to the requestor, and receiving, from the requestor, an indication that the recommendation is accepted.

In some embodiments, the computer-executable instructions, when executed by the processor, can cause the processor to perform operations that further can include obtaining deployment data from a monitoring and reporting module that is in communication with the computing environment; determining a first cost associated with hosting the application at an original computing environment including the computing environment and a second cost associated with hosting the application at a new computing environment; determining that the application should be moved from the computing environment to a new computing environment; triggering moving of the application to the new computing environment; and updating references to the application.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
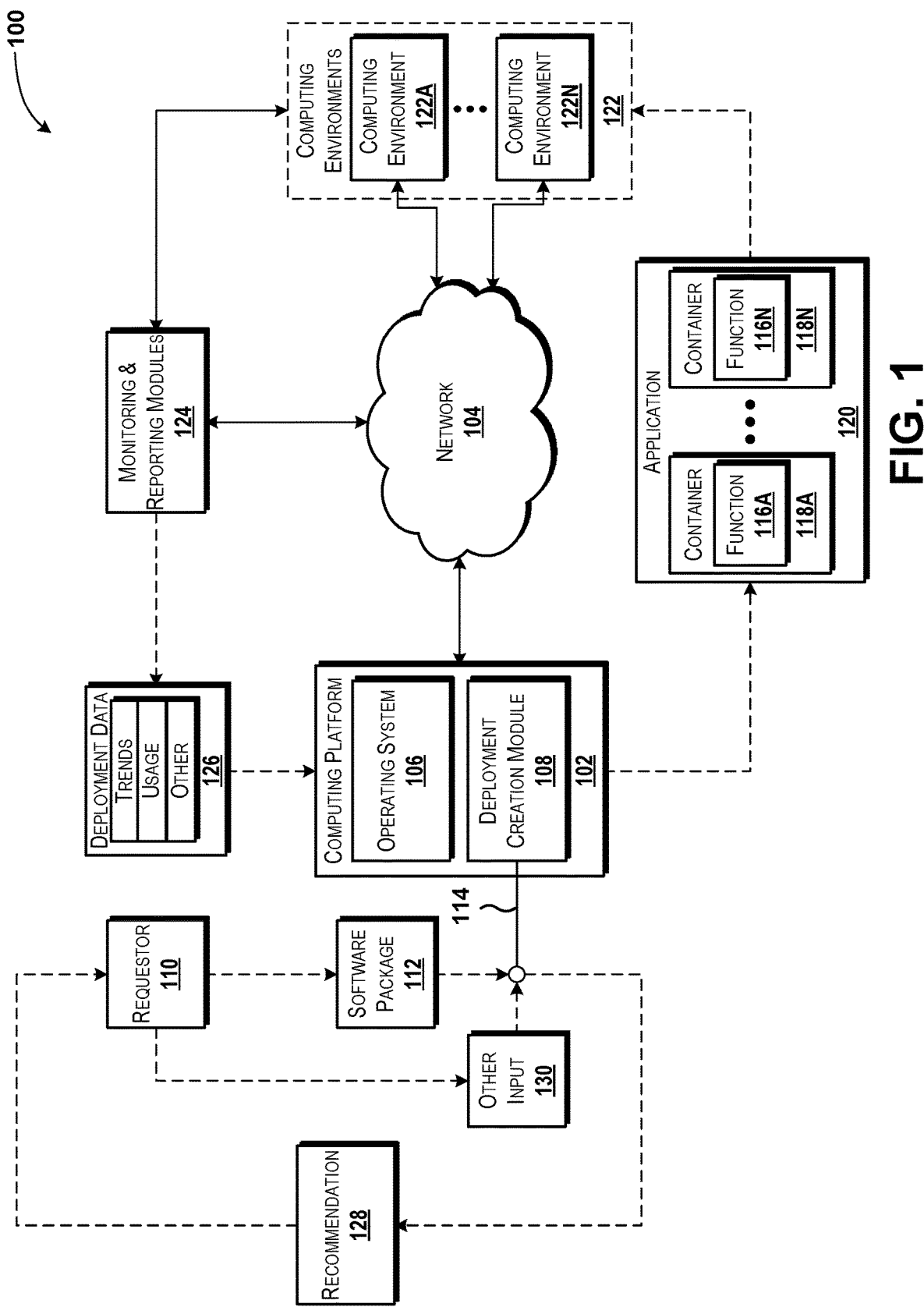
FIG. 1 is a system diagram illustrating an illustrative operating environment for various embodiments of the concepts and technologies described herein.

The following detailed description is directed to a virtualization platform for creating, deploying, modifying, and relocating applications. A computing platform can receive, from a requestor or other entity, a software package. The software package can include software code that corresponds to an application, service, process, or the like, that the requestor wishes to deploy (or have deployed) to a computing environment. The computing platform can, via execution of a deployment creation module, analyze the software page (or the software code included therein) to identify one or more functions performed by the application, service, process, or the like associated with the software package. The computing platform can virtualize and containerize the one or more functions. In some embodiments, the virtualized functions can be hosted by a virtual machine that the computing platform can containerize. Thus, the containerized functions can include not only functions, but also virtual machines that can host the functions. The one or more containers (containing one or more functions) can be packaged by the computing platform as the application illustrated and described herein.

The computing platform also can identify an operating system and/or platform for the application. The computing platform can determine the operating system and/or platform based on input from the requestor or other entities; based on configurations and/or settings information; based on trends and/or usage statistics; based on combinations thereof; and/or based on other information. The computing platform can package the application and deploy the application (or trigger deployment of the application) to the designated computing environment (which can be designated by identification of the operating system and/or platform). The deployed application can include at least one container and the at least one container can include a virtualized function.

The computing platform can be configured to modify the application pre-deployment and/or post-deployment. Specifically, the computing platform can be configured to obtain deployment data from the monitoring and reporting modules; compare the application to the deployment trends or other types of information included in the deployment data; and determine if a change should be made (or if a change should be recommended to be made) to the application based on this analysis. If the computing platform determines that the application should be changed (e.g., by receiving input that indicates that the suggested change should be made), the computing platform can update the application. Updating the application can include virtualizing and containerizing a new function and/or making other changes (e.g., removing a function or container; changing the operating system and/or platform; or the like).

The computing platform also can be configured to move the application from one computing environment to another. In some embodiments, the computing platform can be configured to obtain deployment data from the monitoring and reporting modules; to determine first costs associated with hosting the application at a first computing environment and second costs associated with hosting the application at a second computing environment; and to determine, based on the costs and/or other considerations, whether the application should be moved. If the computing platform determines that the application should be moved to a new computing environment, the computing platform can move (or trigger moving of) the application to the new computing environment. The computing platform also can be configured to update any references to the application (e.g., a web portal or other customer-facing site or functionality may point, via a backend or other type of reference, to a first computing environment and this reference can be updated to point instead to the new computing environment). Because references to the application and/or a hosting platform can be updated in additional and/or alternative manners, it should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a virtualization platform for creating, deploying, modifying, and relocating applications will be described, according to an illustrative embodiment. The operating environment 100 shown in FIG. 1 can include a computing platform 102. The computing platform 102 can operate in communication with and/or as a part of a communications network ("network") 104, though this is not necessarily the case.

According to various embodiments of the concepts and technologies disclosed herein, the functionality of the computing platform 102 can be provided by one or more server computers, one or more desktop computers, one or more mobile telephones, one or more laptop computers, one or more other computing systems, combinations thereof, or the like. It should be understood that the functionality of the computing platform 102 can be provided by a single device, by two similar devices, and/or by two or more dissimilar devices. Furthermore, in some embodiments the functionality of the computing platform 102 can be provided by one or more devices associated with a distributed computing environment and/or storage and processing resources hosted thereon or otherwise provided thereby. For purposes of describing the concepts and technologies disclosed herein, the computing platform 102 is described herein as a server computer. It should be understood that this embodiment is illustrative, and should not be construed as being limiting in any way.

The computing platform 102 can execute an operating system 106 and one or more application programs such as, for example, a deployment creation module 108. The operating system 106 can include a computer program that can be executed to control the operation of the computing platform 102. The deployment creation module 108 can include one or more executable programs that can be configured to execute on top of the operating system 106 to provide various functions as illustrated and described herein. Some of the functionality of the deployment creation module 108 is described below.

According to various embodiments, the deployment creation module 108 can be configured to receive or otherwise obtain, from a user, an operator, a device, an application, or another entity (hereinafter referred to as a "requestor") 110, a software package 112. According to some embodiments, the software package 112 can include software code. The software code can correspond to an application, routine, process, service, or the like.

According to various embodiments of the concepts and technologies disclosed herein, the software package 112 can be uploaded or otherwise submitted to the computing platform 102 to initiate deployment of a software program such as a service, an application, or the like. According to various embodiments of the concepts and technologies disclosed herein, the software package 112 can be submitted, created, uploaded, or otherwise provided to the computing platform 102 via a portal, via a file transfer protocol ("FTP") site, via an upload platform, via a graphical interface, via an application programming interface ("API"), or via other functionality (illustrated in FIG. 1 as element 114 and referred to hereinafter as an "interface 114"). It should be understood that this example is illustrative, and therefore should not be construed as being limiting in any way.

According to various embodiments of the concepts and technologies disclosed herein, as noted above, the software package 112 can include or can correspond to software code. The software code can be formatted as instructions in human readable text, in some embodiments. Additionally, or alternatively, the software code can include objects or the like, which can be created in accordance with an object-oriented design protocol and/or other machine-readable or human-readable programming language(s). According to some other embodiments, the software code can be formatted as machine-readable instructions. Because the software code can be formatted in additional and/or alternative formats, it should be understood that these examples are illustrative, and therefore should not be construed as being limiting in any way.

The deployment creation module 108 can be configured to obtain the software package 112 and to analyze the software package 112. According to some embodiments, the analyzing of the software package 112 can include parsing software code, objects, or other portions of the software package 112 to identify one or more functions or other blocks of functionality 116A-N (hereinafter collectively and/or generically referred to as "functions 116") that are included in the software package 112. The functions 116 can correspond to functionality that is performed by the software code, the objects, or other portions of the software package 112 to perform one or more functions associated with the software package 112. It should be understood that this example is illustrative, and therefore should not be construed as being limiting in any way.

In some embodiments, the deployment creation module 108 also can be configured to virtualize the functions 116 identified during the analysis of the software package 112. As used herein, "virtualization" of the functions 116 can include identifying and/or assembling one or more virtualized network functions (also referred to herein as "VNFS") to provide the functionality associated with one or more of the functions 116 determined by the deployment creation module 108 during analysis of the software package 112. According to some embodiments of the concepts and technologies disclosed herein, virtualizing the functions 116 can include instantiating a virtual machine that hosts one or more virtualized network functions. It should be understood that this example is illustrative, and therefore should not be construed as being limiting in any way.

According to various embodiments of the concepts and technologies disclosed herein, the deployment creation module 108 can be configured to virtualize the functions 116 in a standardized format for deployment. In some embodiments, the deployment creation module 108 can accomplish this by containerizing the functions 116. As used herein, "containerization" of the functions 116 can include the deployment creation module 108 packaging a particular block or portion of the software code (included in the software package 112) that corresponds to a particular one of the functions 116. The deployment creation module 108 can package one or more portions of the software code in one or more associated containers 118A-N (hereinafter collectively and/or generically referred to as "containers 118"). According to various embodiments of the concepts and technologies disclosed herein, each function 116 can be packaged in an associated container 118. Put another way, each function 116 can have a dedicated container 118, which can enable standardization of each piece of functionality of the software package 112 (e.g., the functions 116). It should be understood that this example is illustrative, and therefore should not be construed as being limiting in any way.

Although FIG. 1 shows each of the illustrated containers 118 containing a function 116, it should be understood that the containers 118 can store additional information. In some embodiments, for example, the containers 118 can store information that can describe one or more dependencies between functions 116, information that can describe one or more flows among the functions 116, information that can describe version information for the code that corresponds to the functions 116, information that can describe configuration and/or settings information associated with the functions 116, other information, combinations thereof, or the like. In some embodiments of the concepts and technologies disclosed herein, the functions 116 can also be deployed to virtual machines, and the virtual machines themselves can be containerized in one or more container 118. Thus, it should be understood that the containers 118 can be configured in various languages, formats, and/or objects such as, for example, one or more objects in yet another markup language (also referred to as "YAML ain't another markup language" or "YAML") format; one or more objects in the JavaScript Object Notation ("JSON") format; and/or one or more objects in other human-readable and/or machine readable formats. It should be understood that these examples are illustrative, and therefore should not be construed as being limiting in any way.

Via execution of the deployment creation module 108, the computing platform 102 can create an application 120. The application 120 created by various embodiments of the concepts and technologies disclosed herein can differ from standard applications created in accordance with other technologies. In particular, the application 120 created by the deployment creation module 108 can be ready for deployment and can include one or more containers 118. Each of the containers 118 included in the application 120 can include an associated function 116. As noted above the functions 116 can include a block of functionality associated with the application represented by the software package 112. Also, as noted above, the functions 116 can include virtual machines that host the functions 116, where the virtual machines themselves have been containerized. It can be appreciated that containerizing virtual machines is not conventional. Thus, it can be appreciated that the application 120 can correspond to a standardized version of the service, software package, application, process, or the like that corresponds to the software package 112.

The deployment creation module 108 can be configured to deploy (or trigger deployment of) the application 120 to one or more computing environments 122A-N (hereinafter collectively and/or generically referred to as "computing environments 122"). According to various embodiments of the concepts and technologies disclosed herein, the computing environments 122 can have associated operating systems (not separately labeled in FIG. 1) and/or can correspond to an associated platform type. For example, the computing environment 122A can correspond to one or more devices associated with a host or data center included in a member of the AT&T INTEGRATED CLOUD family of solutions from AT&T Corporation in Dallas, Texas; a host or data center included in other solutions provided by other providers; combinations thereof; or the like.

According to various embodiments of the concepts and technologies disclosed herein, the computing environment 122A can have a first operating system and/or can be a first type of platform and the computing environment 122N can have an nth operating system and/or can be an nth type of platform. Thus, it can be appreciated that creating an application that corresponds to the software package 112 that will operate on one of the computing environments 122 in accordance with traditional approaches would make that application inoperable on another of the computing environments 122. Embodiments of the concepts and technologies disclosed herein provide a solution that allows the application 120 to be deployed to any of the computing environments 122 without making substantial changes to the code included in the application 120.

In particular, the application 120 deployed in accordance with the concepts and technologies disclosed herein includes the containers 118, each of which includes one of the functions 116, which as noted above can be deployed to a virtual machine that is containerized by one of the containers 118. The application 120 is configured for deployment to any of the computing environments 122, a feature that is enabled by the containerization, in the containers 118, of the virtualized functions 116. Thus, the deployment creation module 108 can be configured to deploy the application 120 to any one of the computing environments 122. As will be explained in more detail below, the deployment creation module 108 also can be configured to make changes to the application 120 pre-deployment and/or post-deployment; to move the application 120 to, from, and/or among the computing environments 122; and/or to make other changes to the application 120 as will be illustrated and described in more detail hereinbelow.

According to various embodiments of the concepts and technologies disclosed herein, the operating environment 100 also can include one or more monitoring and reporting modules 124. The monitoring and reporting modules 124 can include one or more computing devices and applications executing thereon to perform the functionality described herein with reference to the monitoring and reporting modules 124. According to various embodiments, the monitoring and reporting modules 124 can analyze deployments of applications or services (e.g., the application 120) to the computing environments 122. The monitoring and reporting modules 124 can determine, based on the analysis of the computing environments 122, functions 116 that have been deployed to the computing environments 122; the prevalence of such deployments of the functions 116; operating systems and/or platform types associated with the applications 120 and/or functions 116 thereof; information (e.g., location, identity, demographics, or the like) associated with requestors of the applications deployed to the computing environments 122 (e.g., the requestor 110 of the application 120); and/or other information.

The monitoring and reporting modules 124 can generate deployment data 126 based on the analyzing and/or monitoring. The deployment data 126 can indicate trends associated with any aspect of the applications (e.g., functions 116 that have been deployed to the computing environments 122; the prevalence of such deployments of the functions 116; operating systems and/or platform types associated with the applications 120 and/or functions 116 thereof; information (e.g., location, identity, demographics, or the like) associated with requestors of the applications deployed to the computing environments 122, and/or other information as illustrated and described herein). The deployment data 126 also can include usage information associated with the computing environments 122 (e.g., processing resource utilization, memory utilization, bandwidth utilization, platform utilization, operating system utilization, operating costs associated with hosting the application 120 at the associated computing environment 122, etc.). The deployment data 126 also can include other information such as, for example, anticipated demand changes, actual demand changes, performance metrics, location information (e.g., locations of users of applications 120; locations of the hosts associated with the application 120; etc.), cost information (actual and expected), combinations thereof, or the like.

The monitoring and reporting modules 124 can be configured to provide the deployment data 126 to the computing platform 102, in some embodiments. In some instances, the monitoring and reporting modules 124 can be configured to provide the deployment data 126 to the computing platform 102 at regular or irregular intervals (e.g., once per second, once per hour, once per day, once per week, combinations thereof, or the like, etc.). In some other cases, the monitoring and reporting modules 124 can be configured to provide the deployment data 126 to the computing platform 102 anytime there is an update to contents of the deployment data 126. In some embodiments, the monitoring and reporting modules 124 can host the deployment data 126 and the computing platform 102 can obtain the deployment data 126 at any time (e.g., regular or irregular intervals, when creating the application 120, or at other times).

In some embodiments, the deployment creation module 108 can be configured to use the deployment data 126 to create the application 120 illustrated and described herein. In particular, the deployment creation module 108 can use the deployment data 126 to source trends, costs, usage statistics, or other information as illustrated and described herein; and to use the information sourced by the deployment data 126 to create recommended features or functions for the application 120. For example, if a particular application 120 includes functions 116 that perform {operations A, B, C, and D}, the deployment data 126 can be analyzed by the deployment creation module 108 to identify any other operations that may be suggested such as, for example, by identifying other applications hosted by the computing environments 122 that include {operations A, B, C, and D} and any additional operations included in those applications. Thus, if an application hosted by the computing environments 122 includes {operations A, B, C, D, and E}, the deployment creation module 108 can be configured to recommend the addition of operation E to the application 120. It should be understood that this example is illustrative, and therefore should not be construed as being limiting in any way.

In some embodiments, the deployment creation module 108 can be configured to modify the application 120 based on configurations and/or settings such as, for example, default settings, settings associated with the requestor 110, settings associated with one or more of the computing environments 122, or the like. In some other embodiments, the deployment creation module 108 can be configured to provide, to the requestor 110 that submitted the software package 112 or another entity (not shown in FIG. 1), a recommendation 128. The requestor 110 (or other entity) can consider the recommended feature or function 116 (as presented in the recommendation 128) and provide other input 130 for accepting or rejecting the recommendation 128. The deployment creation module 108 can modify the application 120 based on the other input 130 (e.g., the function 116 can be added to the application 120 or may not be added to the application). It can be appreciated that the suggested function 116 can be virtualized and containerized as illustrated and described above. It also can be appreciated that the suggestion process illustrated and described herein can occur prior to deployment of the application 120 and/or after deployment of the application 120. It should be understood that these examples are illustrative, and therefore should not be construed as being limiting in any way.

In some embodiments, the deployment creation module 108 also can be configured to analyze the deployment data 126 to determine costs associated with hosting the application 120 on a selected computing environment 122 or an alternative computing environment 122. The deployment creation module 108 can be configured to move the application 120 from a first computing environment 122 to an alternative computing environment 122 based on the costs of hosting the application 120 at two or more computing environments 122. Because the application 120 includes containerized functions 116, moving the application 120 to and/or among the computing environments 122 can be a straightforward task. It should be understood that this example is illustrative, and therefore should not be construed as being limiting in any way.

The deployment creation module 108 also can be configured to prompt the requestor 110 or other entity for identification of a desired operating system and/or platform for the application 120 during creation of the application 120 as illustrated and described herein. In some embodiments, the deployment creation module 108 can be configured to prompt the requestor 110 for identification of the platform or operating system desired for the application 120, which the deployment creation module 108 can use to identify a target computing environment 122 for deployment of the application 120. In some embodiments, the requestor 110 can designate the operating system or platform via a graphical user interface, portal, API, or other functionality such as the interface 114. Thus, it can be appreciated that the other input 130 illustrated and described herein can include data that indicates an operating system and/or platform for the application 120, in some embodiments. It should be understood that this example is illustrative, and therefore should not be construed as being limiting in any way.

In practice, the computing platform 102 can receive, from a requestor 110 or other entity, a software package 112. The software package 112 can include software code that corresponds to an application, service, process, or the like. The computing platform 102 can, via execution of a deployment creation module 108, analyze the software package 112 (or more specifically the software code included therein) to identify one or more functions performed by the application, service, process, or the like associated with the software package 112. The computing platform 102 can virtualize and containerize the one or more functions. In some embodiments, the virtualized functions can be hosted by a virtual machine that the computing platform 102 can containerize. Thus, the containerized functions can include not only functions 116, but also virtual machines that host the functions 116. Thus, the computing platform 102 can receive the software package 112 as input and output the containers 118, wherein each of the containers 118 includes a function 116. The one or more containers 118 (containing one or more functions 116) can be packaged by the computing platform 102 as the application 120 illustrated and described herein. It should be understood that this example is illustrative, and therefore should not be construed as being limiting in any way.

The computing platform 102 also can identify an operating system and/or platform for the application 120. As explained above, the computing platform 102 can make this determination based on input from the requestor 110 or other entities; configurations and/or settings information; trends and/or usage statistics; combinations thereof; or the like. The computing platform 102 can package the application 120 and deploy the application 120 (or trigger deployment of the application 120) to the designated computing environment 122 (which can be designated by identification of the operating system and/or platform).

In some embodiments, the computing platform 102 can be configured to modify the application 120 pre-deployment and/or post-deployment. Specifically, the computing platform 102 can be configured to obtain deployment data 126 from the monitoring and reporting modules 124; compare the application 120 to the deployment trends or other types of information included in the deployment data 126; and determine if a change should be made (or should be recommended to be made) to the application 120 based on this analysis. If the computing platform 102 determines that the application 120 should be changed (e.g., by receiving input that indicates that the suggested change should be made), the computing platform 102 can update the application 120. As mentioned above, updating the application 120 can include virtualizing and containerizing a new function 116 and/or making other changes (e.g., removing a function 116 or container 118; changing the operating system and/or platform; or the like). It should be understood that this example is illustrative, and therefore should not be construed as being limiting in any way.

In some embodiments, the computing platform 102 can be configured to move the application 120 from one computing environment 122 to another at any time. Specifically, the computing platform 102 can be configured to obtain deployment data 126 from the monitoring and reporting modules 124; to determine first costs associated with hosting the application 120 at a first computing environment 122 and second costs associated with hosting the application 120 at a second computing environment 122; and to determine, based on the costs and/or other considerations, whether the application 120 should be moved. If the computing platform 102 determines that the application 120 should be moved to a new computing environment 122, the computing platform 102 can move (or trigger moving of) the application 120 to the new computing environment 122. The computing platform 102 also can be configured to update any references to the application 120 (e.g., a web portal or other customer-facing site or functionality may point, via a backend or other type of reference, to a first computing environment 122 and this reference can be updated to point instead to the new computing environment 122). Because references to the application 120 and/or a hosting platform can be updated in additional and/or alternative manners, it should be understood that this example is illustrative, and therefore should not be construed as being limiting in any way.

Although the deployment creation module 108 is illustrated as a component of the computing platform 102, it should be understood that the deployment creation module 108 may be embodied as or in a stand-alone device, a component thereof, and/or over distributed computing resources that can operate as part of or in communication with the network 104 and/or the computing platform 102. As such, the illustrated embodiment should be understood as being illustrative of only some contemplated embodiments and should not be construed as being limiting in any way.

FIG. 1 illustrates one computing platform 102, one network 104, one requestor 110, one interface 114, two computing environments 122, and one instance of the monitoring and reporting modules 124. It should be understood, however, that various implementations of the operating environment 100 can include zero, one, or more than one computing platform 102; zero, one, or more than one network 104; zero, one, or more than one requestor 110; zero, one, or more than one interface 114; zero, one, two, or more than two computing environments 122; and/or zero, one, or more than one instance of the monitoring and reporting modules 124. As such, the illustrated embodiment should be understood as being illustrative, and should not be construed as being limiting in any way.

Figure 2:
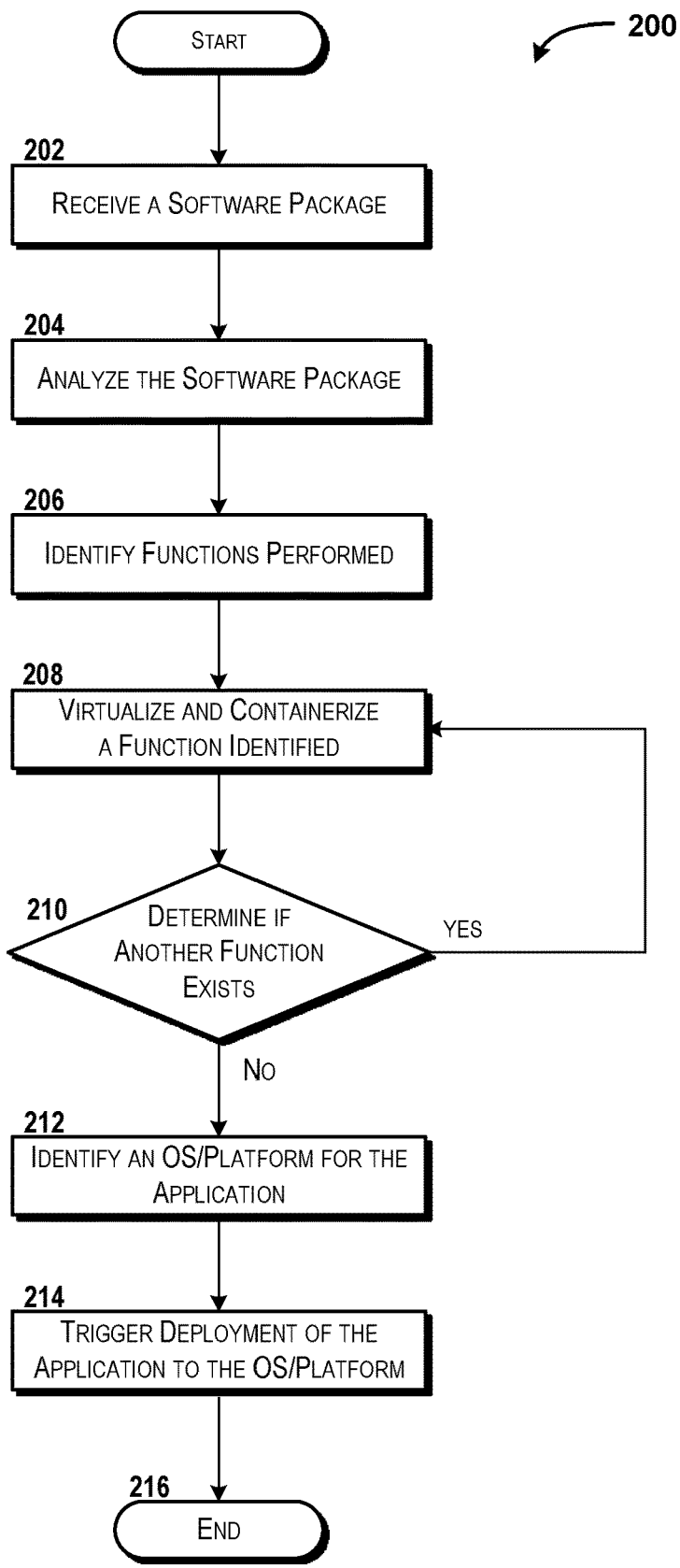
FIG. 2 is a flow diagram showing aspects of a method for creating and deploying an application, according to an illustrative embodiment of the concepts and technologies described herein.

Turning now to FIG. 2, aspects of a method 200 for creating and deploying an application will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing platform 102, to perform one or more operations and/or causing the processor to direct other components of the computing system or device to perform one or more of the operations.

For purposes of illustrating and describing the concepts of the present disclosure, the methods disclosed herein are described as being performed by the computing platform 102 via execution of one or more software modules such as, for example, the deployment creation module 108. It should be understood that additional and/or alternative devices and/or network nodes can provide the functionality described herein via execution of one or more modules, applications, and/or other software including, but not limited to, the deployment creation module 108. Thus, the illustrated embodiments are illustrative, and should not be viewed as being limiting in any way.

The method 200 begins at operation 202. At operation 202, the computing platform 102 can receive a software package. In some embodiments, for example, the computing platform 102 can receive a software package such as the software package 112. As explained above, the software package 112 can correspond, in some embodiments, to an application, a service, an application or service module, a process, or other functionality (or collection of functionality). According to various embodiments of the concepts and technologies disclosed herein, the software package 112 can be provided as software code. The software code can be formatted as human-readable code, as machine-readable code, as executable instructions, as objects, and/or as a combination of human-readable code, machine-readable code, executable instructions, objects, or the like.

From operation 202, the method 200 can proceed to operation 204. At operation 204, the computing platform 102 can analyze the software package 112 received in operation 202. According to various embodiments of the concepts and technologies disclosed herein, the computing platform 102 can analyze the software code included in the software package 112 and parse, from the software code, one or more functions performed by the software package 112 and/or an application that corresponds to the software package 112. Thus, while not illustrated in FIG. 1, it can be appreciated that the computing platform 102 can access a library or other resource to determine, based on the software code, one or more functions performed by the software package 112 and/or an application that corresponds to the software package 112, though this is not necessarily the case. In some embodiments, programming comments or other information can also be used to identify functions. Because the analysis of the software code included in the software package 112 can include determining functions in additional and/or alternative manners, it should be understood that these examples are illustrative, and therefore should not be construed as being limiting in any way.

From operation 204, the method 200 can proceed to operation 206. At operation 206, the computing platform 102 can identify, via the analyzing performed in operation 204, a function performed by the application 120 to which the software package 112 corresponds. It can be appreciated that the computing platform 102 can determine one or more functions in operation 206. According to various embodiments, the software package 112 can perform any number of functions and the computing platform 102 therefore can identify, in operation 206, any number of functions.

From operation 206, the method 200 can proceed to operation 208. At operation 208, the computing platform 102 can virtualize and containerize a one of the functions performed by the software code included in the software package 112 as identified in operation 206. According to various embodiments of the concepts and technologies disclosed herein, the function identified by the computing platform 102 in operation 206 can be virtualized by the computing platform 102 and the virtualized function 116 can either be loaded into a container 118 or hosted by a virtual machine that is itself containerized by the computing platform 102. Thus, operation 208 includes not only virtualizing the function performed by the software package 112, but also loading the virtualized function 116 into a container 118 (or loading a virtual machine that hosts the virtualized function 116 into a container 118). It should be understood that this example is illustrative, and therefore should not be construed as being limiting in any way.

From operation 208, the method 200 can proceed to operation 210. At operation 210, the computing platform 102 can determine if another function 116 (e.g., a function 116 in addition to the function 116 virtualized and containerized in a most recent iteration of operation 208) exists in the software package 112. If the computing platform 102 determines, at operation 210, that another function 116 exists, the method 200 can return to operation 208. In a new iteration of operation 208, the computing platform 102 can virtualize and containerize a next function identified (e.g., in operation 206). According to various embodiments of the concepts and technologies disclosed herein, operations 208-210 can be repeated until the computing platform 102 determines, in any iteration of operation 210, that no additional functions 116 exist in the software package 112.

If the computing platform 102 determines, at operation 210, that another function 116 does not exist, the method 200 can proceed to operation 212. At operation 212, the computing platform 102 can identify an operating system and/or a platform for the application 120 that is to be deployed. As explained above, the computing platform 102 can determine the operating system and/or platform based on one or more interactions with the requestor 110 or other entity; based on configurations or settings associated with the requestor 110 or other entity; based on availability information associated with two or more computing environments 122; based on cost information associated with the two or more computing environments 122; combinations thereof; or the like. Regardless of how the computing platform 102 identifies the operating system and/or platform for the application 120, operation 212 can result in the computing platform 102 identifying a target computing environment 122 to which the application 120 is to be deployed.

From operation 212, the method 200 can proceed to operation 214. At operation 214, the computing platform 102 can trigger deployment of the application 120. In some embodiments, the computing platform 102 can deploy the application 120 (which can include at least one container 118 containing at least one function 116) to a computing environment such as one of the computing environments 122 illustrated and described with reference to FIG. 1. In some other embodiments, the computing platform 102 can instruct, command, request, or otherwise trigger deployment of the application 120 to a computing environment such as one of the computing environments 122 by another device or entity. It can be appreciated that the computing environment 122 to which the application 120 is deployed can be identified based on the OS and/or platform identified in operation 212, in some embodiments.

From operation 214, the method 200 can proceed to operation 216. The method 200 can end at operation 216.

Figure 3:
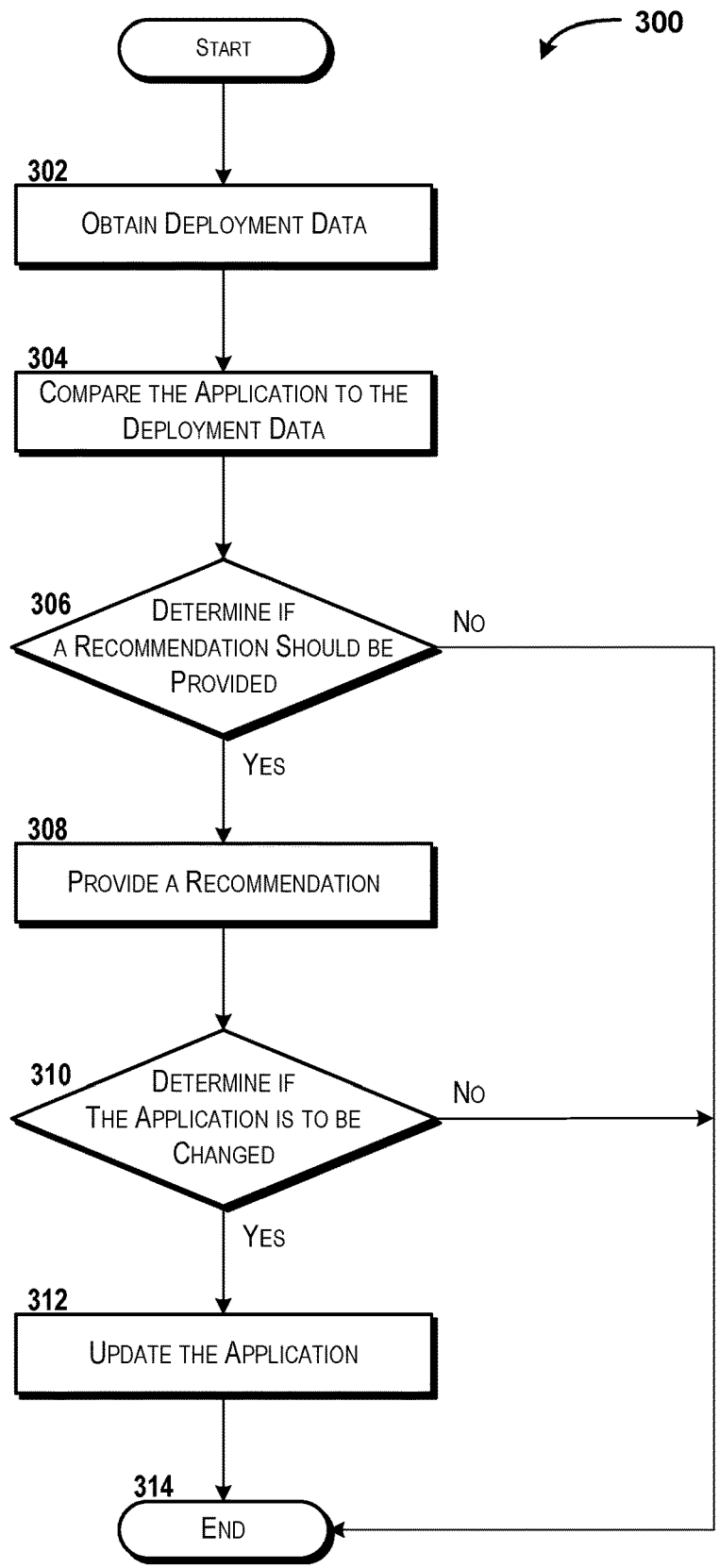
FIG. 3 is a flow diagram showing aspects of a method for modifying an application, according to an illustrative embodiment of the concepts and technologies described herein.

Turning now to FIG. 3, aspects of a method 300 for modifying an application will be described in detail, according to an illustrative embodiment. It should be understood that the method 300 can be performed by the computing platform 102 prior to deployment of the application 120 and/or after deployment of the application 120. In particular, the method 300 can be performed by the computing platform 102 to consider modification to the application 120 prior to deployment and/or after deployment.

The method 300 begins at operation 302. At operation 302, the computing platform 102 can obtain deployment data such as the deployment data 126 illustrated in FIG. 1. As explained above with reference to FIG. 1, the computing platform 102 can obtain the deployment data 126 at almost any time including, but not limited to, irregular intervals, regular intervals, when an update is made to the information reflected by the deployment data 126, or at other times. Furthermore, as explained above, the computing platform 102 can obtain the deployment data 126 by receiving the deployment data 126 from the monitoring and reporting modules 124; by downloading the deployment data 126 from the monitoring and reporting modules 124; by receiving and/or accessing the deployment data 126 via a device in communication with the monitoring and reporting modules 124 (e.g., an intermediary or the like); and/or by obtaining the deployment data 126 in additional or alternative manners.

From operation 302, the method 300 can proceed to operation 304. At operation 304, the computing platform 102 can compare the application 120 to the deployment data 126. Thus, the computing platform 102 can compare the application 120 to one or more trends reflected by the deployment data 126. For example, the computing platform 102 can determine, based on the deployment data 126, functionality of one or more applications that are hosted by one or more of the computing environments 122. The computing platform 102 can determine, for example, functions 116 that tend to be deployed as part of one application 120; security considerations for applications like the application 120; functionality that is missing in the application 120 relative to other similar applications; combinations thereof; or the like.

From operation 304, the method 300 can proceed to operation 306. At operation 306, the computing platform 102 can determine if a recommendation should be provided. In some embodiments, for example, the computing platform 102 can determine, in operation 306, whether a recommendation to change the application 120 should be provided to a user or other entity such as, for example, the requestor 110. In some embodiments, for example, the computing platform 102 can determine, based on the comparing in operation 306, if the application 120 should be changed (e.g., if a function 116 should be added to the application 120, if a function 116 should be removed from the application 120, if the application 120 should be deployed to a particular computing environment 122, or the like).

In some other embodiments, the computing platform 102 can determine, in operation 306, if a specified operating system and/or platform for the application 120 should be changed. The computing platform 102 can be configured to recommend changes to the application 120 to a requestor 110 or other entity before implementing the changes, in some embodiments. In some other embodiments, the computing platform 102 can be configured to automatically make some changes to the application 120 when a recommendation is determined to be appropriate based on configurations or settings associated with the requestor 110, the computing environments 122, a network operator, or another entity. Thus, embodiments of the concepts and technologies disclosed herein can improve efficiency of the computing platform 102 and/or devices hosting the application 120 by enabling the suggestion, approval, and implementation of changes to the application 120 almost instantly without requiring external interactions. It should be understood that this example is illustrative, and therefore should not be construed as being limiting in any way.

If the computing platform 102 determines, in operation 306, that the recommendation should be provided, the method 300 can proceed to operation 308. At operation 308, the computing platform 102 can provide a recommendation such as the recommendation 128 to a user or other entity such as the requestor 110. As explained above, the recommendation 128 can indicate the suggested change to the application 120 (e.g., a suggested addition of a function 116, a suggested removal of the function 116, or the like). In some embodiments, as explained above, the functionality of operation 308 can be removed in some embodiments because the changes may be automatically accepted in some instances. It should be understood that this example is illustrative, and therefore should not be construed as being limiting in any way.

From operation 308, the method 300 can proceed to operation 310. At operation 310, the computing platform 102 can determine if the application 120 is to be changed. In some embodiments, for example, the computing platform 102 can determine, in operation 310, whether the recommendation provided in operation 308 was accepted or not. This determination can be based on the other input 130 as illustrated and described above with reference to FIG. 1. In some other embodiments, the computing platform 102 can determine whether or not the application 120 is to be changed based on settings, configurations, or the like.

If the computing platform 102 determines, in operation 310, that the application 120 is to be changed, the method 300 can proceed to operation 312. At operation 312, the computing platform 102 can update the application 120. According to various embodiments of the concepts and technologies disclosed herein, the application 120 can be updated to add a function 116 (in an associated container 118) to the application 120; to remove a function 116 (and its associated container 118) from the application 120; to change a target computing environment (e.g., based on a change to the operating system and/or platform associated with the application 120); or the like. Thus, operation 312 can include, in some embodiments, virtualizing a new function as a new function 116, adding the new function 116 to a new container 118, and adding the container 118 that includes the function 116 to the application 120. It should be understood that this example is illustrative, and therefore should not be construed as being limiting in any way.

From operation 312, the method 300 can proceed to operation 314. The method 300 also can proceed to operation 314 from operation 306 if the computing platform 102 determines, in operation 306, that a recommendation should not be provided. The method 300 also can proceed to operation 314 from operation 310 if the computing platform 102 determines, in operation 310, that the application 120 is not to be changed. The method 300 can end at operation 314.

Figure 4:
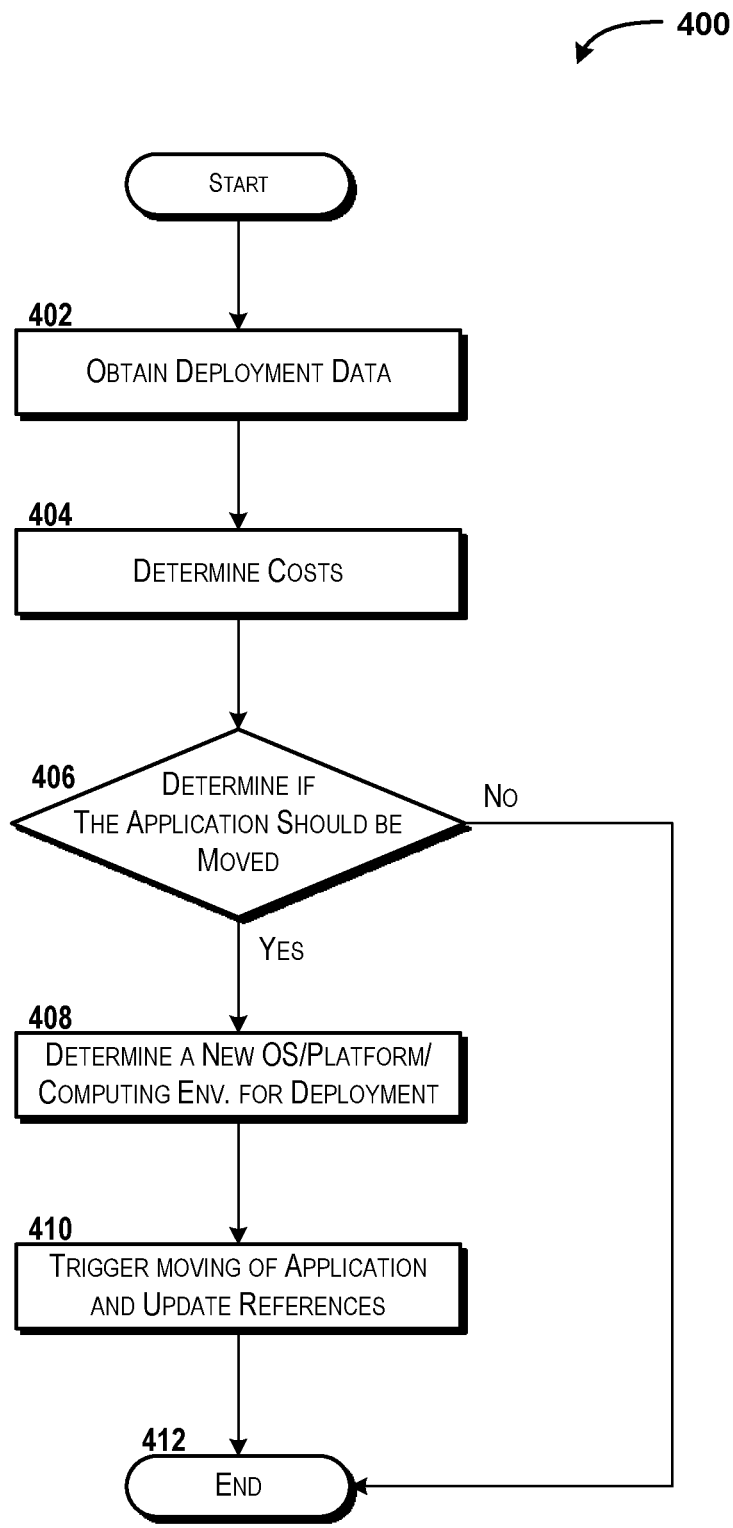
FIG. 4 is a flow diagram showing aspects of a method for modifying an application, according to another illustrative embodiment of the concepts and technologies described herein.

Turning now to FIG. 4, aspects of a method 400 for modifying an application will be described in detail, according to an illustrative embodiment. It should be understood that the functionality illustrated and described herein with reference to the method 400 can be performed by the computing platform 102 before deployment of the application 120 and/or after deployment of the application 120. In particular, the method 400 can be performed by the computing platform 102 to consider modification of a targeted computing environment 122 for the application 120 prior to deployment of the application 120 and/or after deployment of the application 120. In one contemplated embodiment, the computing platform 102 can be configured to perform operations illustrated and described herein with reference to the method 400 each day in response to an entity (e.g., the requestor 110) selecting an option to minimize costs associated with the application 120 on a daily basis. Because the method 400 can be performed at additional and/or alternative times, it should be understood that this example is illustrative, and therefore should not be construed as being limiting in any way.

The method 400 begins at operation 402. At operation 402, the computing platform 102 can obtain deployment data such as the deployment data 126 illustrated in FIG. 1. It should be understood that the operation 402 can be, but is not necessarily, similar or even identical to the operation 302 described above with regard to FIG. 3. As explained above, the deployment data 126 can include cost information such as resource usage (processor utilizations, memory utilizations, bandwidth utilizations, etc.); costs for the resource usage; availability of resources in one or more computing environments 122; combinations thereof; or the like.

From operation 402, the method 400 can proceed to operation 404. At operation 404, the computing platform 102 can determine costs associated with the application 120 being hosted at two or more of the computing environments 122. Thus, the computing platform 102 can at least determine a first cost associated with hosting the application 120 at a first computing environment 122 and a second cost associated with hosting the application 120 at a second computing environment 122. It can be appreciated that the computing platform 102 can be configured to determine, for each computing environment 122 that is capable of hosting the application 120, an associated cost for hosting the application 120. It should be understood that this example is illustrative, and therefore should not be construed as being limiting in any way.

From operation 404, the method 400 can proceed to operation 406. At operation 406, the computing platform 102 can determine if the application 120 should be moved. The computing platform 102 can make the determination in operation 406 by determining whether or not the lowest cost determined in operation 404 is associated with the computing environment 122 that currently is hosting the application 120, for example. In some instances, multiple measures of cost (e.g., dollar cost, processor resource usage, memory resource usage, bandwidth usage, time usage, latency, or the like) can be calculated in operation 404 and considered in operation 406. As such, a prioritized cost of multiple costs can be analyzed in operation 406, in some embodiments. If a cost or prioritized cost of hosting the application 120 at a current computing environment 122 is determined to not be a minimum cost (or prioritized cost), the computing platform 102 can determine that the application 120 should be moved. Because the computing platform 102 can determine that the application should be moved in additional and/or alternative ways, it should be understood that these examples are illustrative, and therefore should not be construed as being limiting in any way.

If the computing platform 102 determines, in operation 406, that the application 120 should be moved, the method 400 can proceed to operation 408. At operation 408, the computing platform 102 can determine an OS, platform, or computing environment 122 to which the application 120 should be moved. In some embodiments, the computing platform 102 can identify the computing environment 122 (or operating system or platform) by identifying an operating system, platform, and/or computing environment 122 that will minimize costs as determined in operation 404. Although not shown in FIG. 4, it should be understood that the application 120 can be repackaged by the computing platform 102 for the new host computing environment 122. It should be understood that this example is illustrative, and therefore should not be construed as being limiting in any way.

From operation 408, the method 400 can proceed to operation 410. At operation 410, the computing platform 102 can trigger moving of the application 120 to the new OS, platform, and/or computing environment 122. In some embodiments, the computing platform 102 can move the application 120 (which can include at least one container 118 containing at least one function 116) to the new operating system, platform, and/or associated computing environment 122. In some other embodiments, the computing platform 102 can instruct, command, request, or otherwise trigger moving of the application 120 to the new operating system, platform, and/or associated computing environment 122. The computing platform 102 also can update any references to the application 120 (e.g., a web portal or other customer-facing site or functionality may point, via a back-end or other type of reference, to a first computing environment 122 and this reference can be updated to point instead to the new computing environment 122). Because references to the application 120 and/or a hosting platform can be updated in additional and/or alternative manners, it should be understood that this example is illustrative, and therefore should not be construed as being limiting in any way.

From operation 410, the method 400 can proceed to operation 412. The method 400 can end at operation 412.

It should be understood that embodiments of the concepts and technologies disclosed herein can be use used to support concepts and technologies for maintaining and updating security for a network (e.g., the network 104), a computing environment (e.g., the computing environments 122), and/or applications (e.g., the application 120). According to some embodiments, the deployment data 126 can include data that relates to security trends and/or security-related information. Thus, for example, the deployment can be monitored to determine if a security threat, risk, or attack is detected. For example, the security trends may indicate an unexpected spike in traffic or bandwidth that is not related to normal traffic. Thus, for example, a zero day vulnerability may be detected quickly (e.g., based on the increased load) and addressed according to various embodiments of the concepts and technologies disclosed herein. In particular, a user or other entity may specify a level of aggressiveness with which deployments may be redeployed, modified, and/or patched based on security considerations. Thus, in some embodiments, a user or other entity may specify a desired level of responsiveness (e.g., low, medium, high, or the like) for addressing security considerations and various remediation operations can be automated for responding to detected threats, vulnerabilities, and/or attacks. Thus, the rollout of security patches, for example, can be automated and deployed based on the security trends or other information, for example. According to various embodiments of the concepts and technologies disclosed herein, a user can be presented with an option (by the computing platform 102) to override deployment, redeployment, reconfirmation, patching, and/or other operations. In some embodiments, the user or other entity can be given an interval of time within which an override can be commanded to prevent the deployment, redeployment, reconfiguration, and/or patching. Thus, the concepts and technologies disclosed herein can provide quick resolution of security threats while enabling users or other entities to control such rollouts, in some cases. It should be understood that this example is illustrative, and therefore should not be construed as being limiting in any way.

Figure 5:
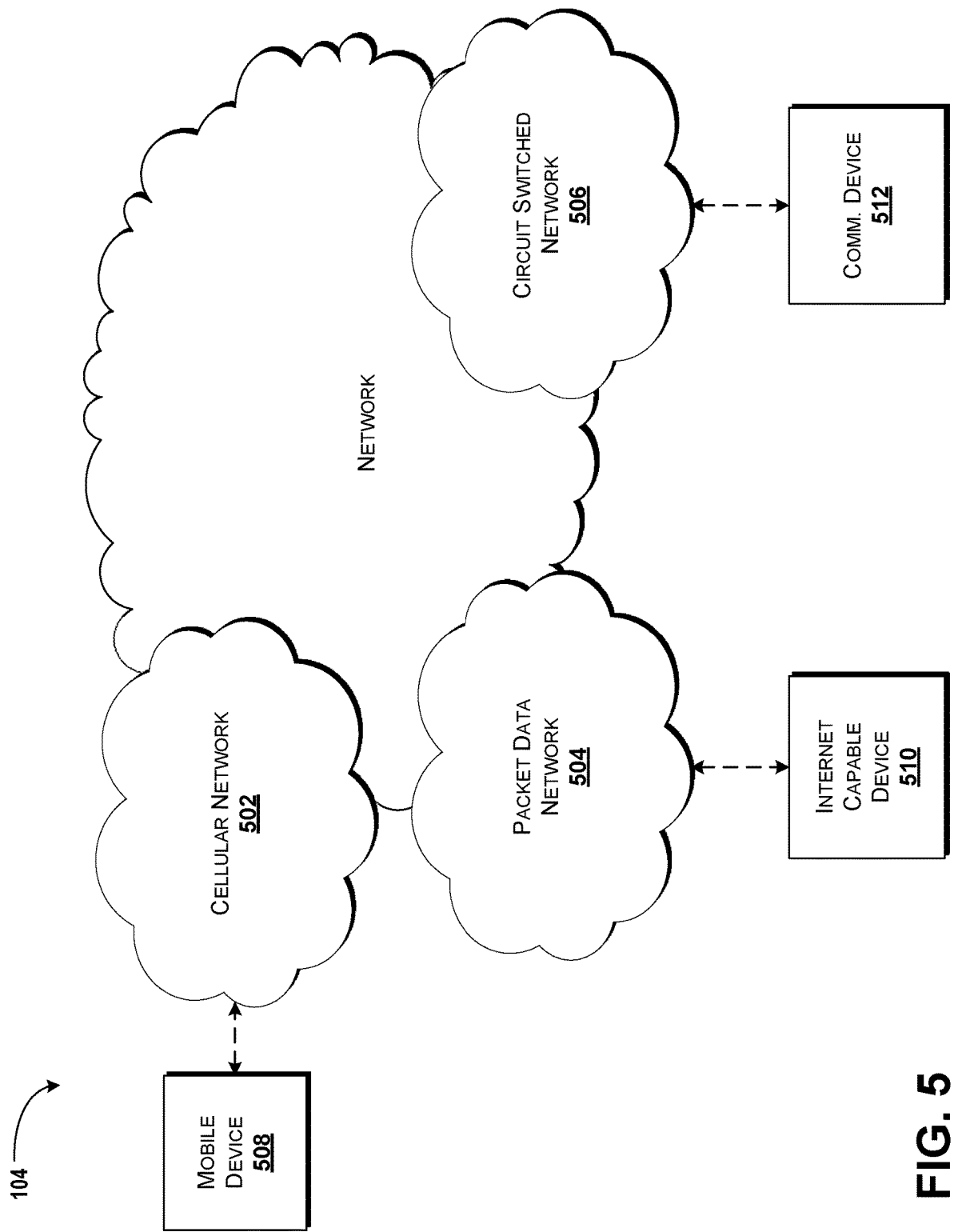
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
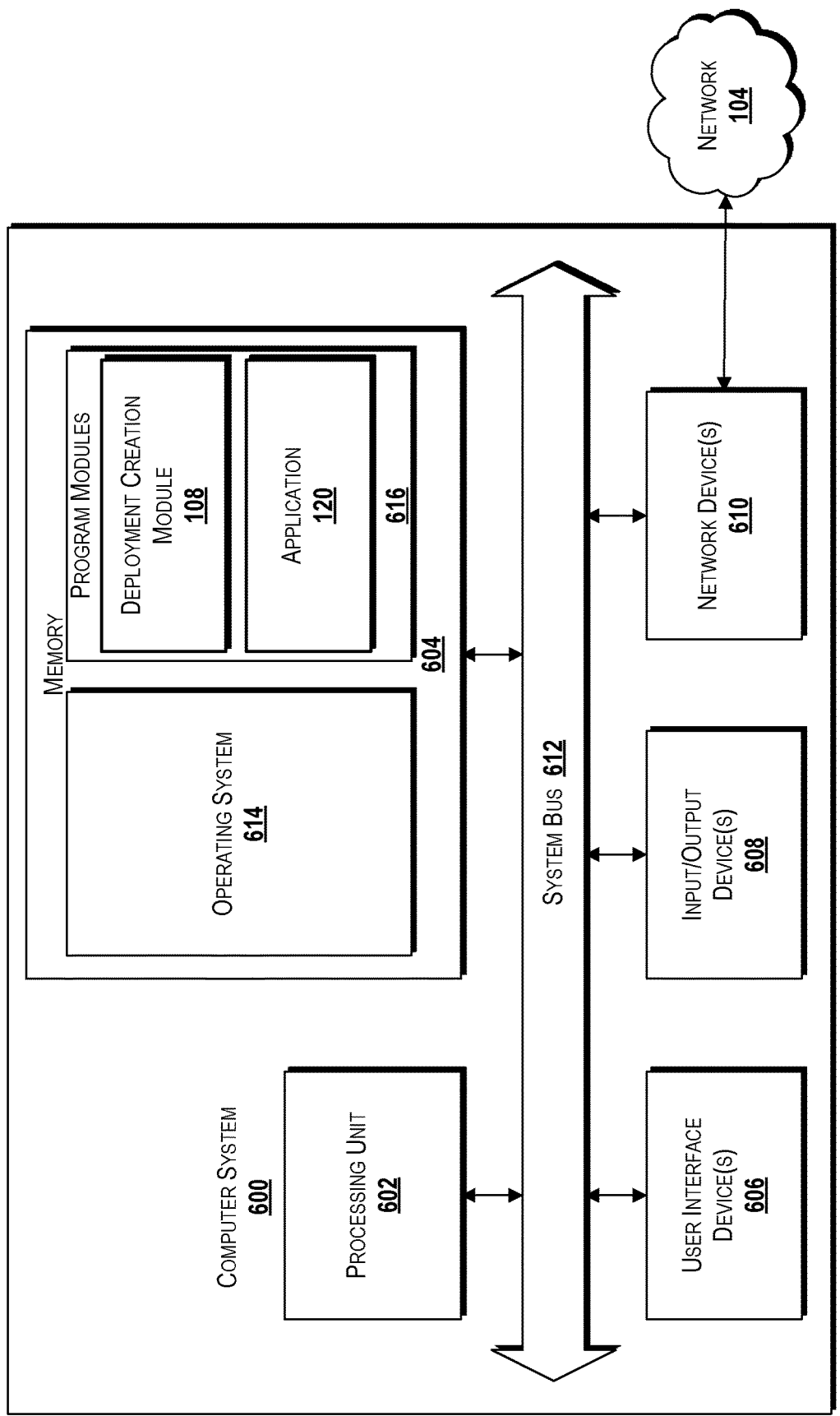
FIG. 6 is a block diagram illustrating an example computer system configured to provide a virtualization platform for creating, deploying, modifying, and relocating applications, according to some illustrative embodiments of the concepts and technologies described herein.

FIG. 6 is a block diagram illustrating a computer system 600 configured to provide the functionality described herein for providing a virtualization platform for creating, deploying, modifying, and relocating applications, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the deployment creation module 108. This and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the software package 112, the functions 116, the containers 118, the application 120, the deployment data 126, the recommendation 128, the other input 130, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a virtualization platform for creating, deploying, modifying, and relocating applications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A system comprising:
a processor; and
a memory that stores computer-executable instructions that, when executed by the processor, cause the processor to perform operations comprising
receiving software code that corresponds to a software application,
analyzing the software code to identify a plurality of functions performed by the software application,
virtualizing a first function of the plurality of functions and a second function of the plurality of functions,
creating a first container for the first function of the plurality of functions and a second container for the second function of the plurality of functions, identifying a computing environment that is to host an application comprising the first container and the second container, and triggering deployment of the application to the computing environment.

2. The system of claim 1, wherein triggering the deployment of the application comprises sending, to the computing environment, the first container and the second container.

3. The system of claim 1, wherein the software code is received from a requestor.

4. The system of claim 3, wherein the computer-executable instructions, when executed by the processor, cause the processor to perform operations further comprising:
determining if the application is to be changed.

5. The system of claim 4 wherein determining if the application is to be changed comprises:
determining if a recommendation should be provided to the requestor, wherein the recommendation indicates one of a third function that should be added to the application or a fourth function that should be removed from the application; and
in response to a determination that the recommendation should be provided to the requestor,
providing the recommendation to the requestor, and
receiving, from the requestor, an indication that the recommendation is accepted.

6. The system of claim 1, wherein the software code is obtained from a requestor and via an application programming interface.

7. The system of claim 1, wherein the computer-executable instructions, when executed by the processor, cause the processor to perform operations further comprising:
obtaining deployment data from a monitoring and reporting module that is in communication with the computing environment;
comparing the application to the deployment data;
determining that the application is to be changed; and
updating the application.

8. A method comprising:
receiving, at a computing platform comprising a processor, software code that corresponds to a software application;
analyzing, by the processor, the software code to identify a plurality of functions performed by the software application;
virtualizing, by the processor, a first function of the plurality of functions and a second function of the plurality of functions;
creating, by the processor, a first container for the first function of the plurality of functions and a second container for the second function of the plurality of functions;
identifying, by the processor, a computing environment that is to host an application comprising the first container and the second container; and
triggering, by the processor, deployment of the application to the computing environment.

9. The method of claim 8, wherein triggering the deployment of the application comprises sending, to the computing environment, the first container and the second container.

10. The method of claim 8, wherein identifying the computing environment comprises determining a platform that is to host the application.

11. The method of claim 8, wherein the software code is received from a requestor.

12. The method of claim 11, wherein the software code is obtained via an application programming interface that is exposed by the computing platform.

13. The method of claim 8, further comprising:
obtaining, by the computing platform, deployment data from a monitoring and reporting module that is in communication with the computing environment;
comparing, by the computing platform, the application to the deployment data;
determining, by the computing platform, that the application is to be changed; and
updating, by the computing platform, the application.

14. The method of claim 13, wherein the software code is received from a requestor, and wherein determining if the application is to be changed comprises:
determining, by the computing platform, if a recommendation should be provided to the requestor, wherein the recommendation indicates one of a third function that should be added to the application or a fourth function that should be removed from the application; and
in response to a determination that the recommendation should be provided to the requestor,
providing, by the computing platform, the recommendation to the requestor, and
receiving, by the computing platform and from the requestor, an indication that the recommendation is accepted.

15. A computer storage medium having computer-executable instructions stored thereon that, when executed by a processor, cause the processor to perform operations comprising:
receiving software code that corresponds to a software application;
analyzing the software code to identify a plurality of functions performed by the software application;
virtualizing a first function of the plurality of functions and a second function of the plurality of functions;
creating a first container for the first function of the plurality of functions and a second container for the second function of the plurality of functions;
identifying a computing environment that is to host an application comprising the first container and the second container; and
triggering deployment of the application to the computing environment.

16. The computer storage medium of claim 15, wherein the software code is received from a requestor.

17. The computer storage medium of claim 16, wherein the software code is obtained via an application programming interface.

18. The computer storage medium of claim 15, wherein the computer-executable instructions, when executed by the processor, cause the processor to perform operations further comprising:
obtaining deployment data from a monitoring and reporting module that is in communication with the computing environment;
comparing the application to the deployment data;
determining if the application is to be changed; and
updating the application.

19. The computer storage medium of claim 18, wherein the software code is received from a requestor, and wherein determining if the application is to be changed comprises:
determining if a recommendation should be provided to the requestor, wherein the recommendation indicates one of a third function that should be added to the application or a fourth function that should be removed from the application; and in response to a determination that the recommendation should be provided to the requestor,
providing the recommendation to the requestor, and
receiving, from the requestor, an indication that the recommendation is accepted.

20. The computer storage medium of claim 15, wherein triggering the deployment of the application comprises sending, to the computing environment, the first container and the second container.

\* \* \* \* \*